Dec. 13, 1949  J. E. HANSEN  2,490,868
EYEGLASS FRAME CONSTRUCTION
Filed Nov. 26, 1948
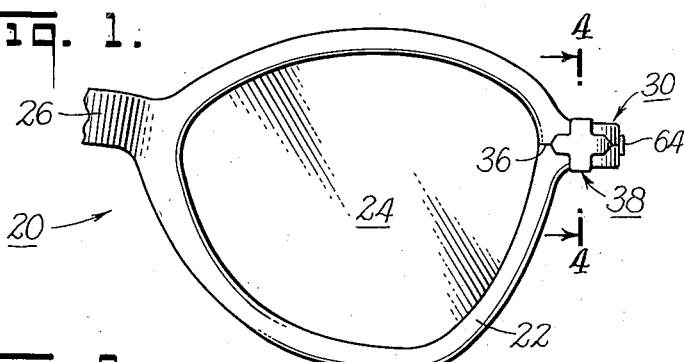
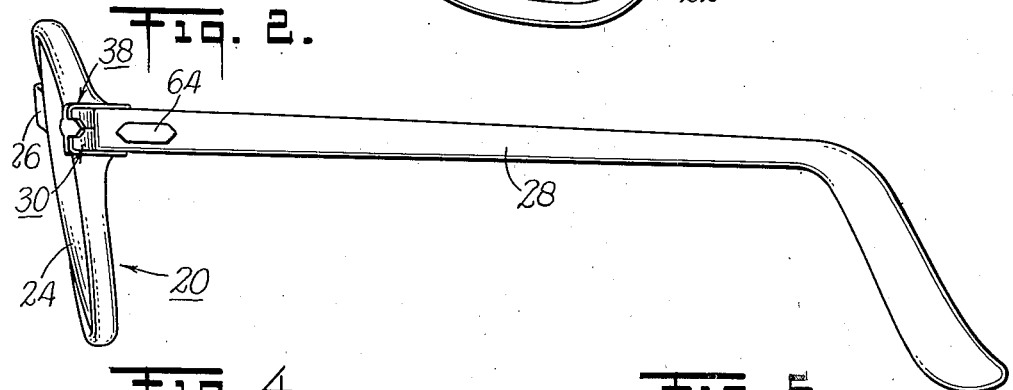
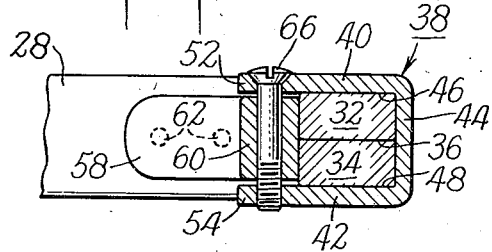
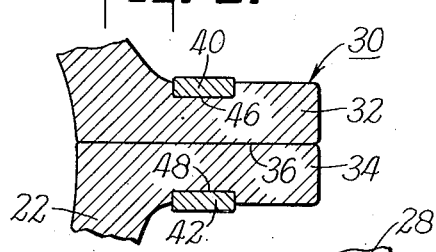
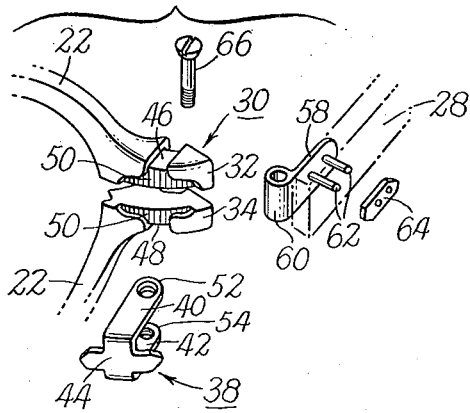
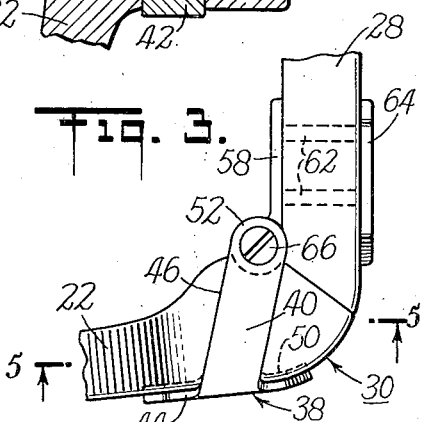
INVENTOR
*Julius E. Hansen*
BY
*Blair and Black*
ATTORNEYS Patented Dec. 13, 1949

2,490,868

UNITED STATES PATENT OFFICE 2,490,868

EYEGLASS FRAME CONSTRUCTION

Julius E. Hansen, Providence, R. I., assignor to Bay State Optical Company, Attleboro, Mass.

Application November 26, 1948, Serial No. 62,067

4 Claims. (Cl. 88—53)

This invention relates to a non-metallic eyeglass construction.

One of the objects of this invention is to provide a non-metallic eyeglass construction the components of which can economically be mass-produced and assembled without the services of highly skilled workers. Another object is to provide an eyeglass construction which combines durability with a pleasing appearance. A further object is to provide a construction of the above character which is simple and yet has great strength and resistance to shocks and warping stresses. Another object is to provide a construction of the above character in which the mounting of lenses becomes foolproof and requires only the most ordinary tools. A further object is to provide a fitting for hingedly connecting a temple to a non-metallic eyeglass frame which is wholly free of manufacturing, assembling, and maintenance complications. Another object is to provide a fitting of the above character which will withstand the shocks and stresses of hard use and at the same time is neat and attractive in appearance. Yet another objective is to provide an eyeglass frame in which the lenses may be easily mounted. Other objects will in part be pointed out as the description proceeds and will in part become apparent therefrom.

The invention accordingly consists in the features of construction, combinations of elements, and arrangements of parts as will be exemplified in the structure and to be hereinafter described and the scope of the application of which will be set forth in the accompanying claims.

In this specification and the accompanying drawings I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in various forms, each as may be best suited to the conditions of a particular use.

In the drawings, in which is shown one of the various possible embodiments of the invention:

Figure 1 is a front elevation on an enlarged scale of a portion of a preformed eyeglass frame having my endpiece and hinge construction applied thereto;

Figure 2 is a side elevation of the eyeglass frame shown in Figure 1;

Figure 3 is a fragmentary plan view on a larger scale showing the hinge construction;

Figure 4 is an enlarged fragmentary sectional view taken along the line 4—4 of Figure 1;

Figure 5 is a fragmentary sectional view taken along the line 5—5 of Figure 3; and Figure 6 is a fragmentary exploded perspective view of the parts which together form the endpiece and hinge assembly.

Similar reference characters refer to similar parts throughout the several views of the drawings.

It might here be noted that reference hereinafter to an "outward" direction signifies a direction toward the left or right from the bridge of an eyeglass frame while the term "inward" denotes a direction toward the bridge from one of the temples. A "rearward" direction refers to a direction toward the face of the wearer whereas the term "forward" denotes the opposite direction. The "upward" direction refers to the direction upwardly from the face of the wearer while a "downward" direction is opposite thereto.

In order that certain features of this invention may be better understood, it is appropriate to point out that various difficulties have been encountered in attempting to achieve a reliable, durable and completely satisfactory connection between a temple and a non-metallic endpiece. Considerable trouble has been experienced in attempting to construct a connection between the temple and front of a non-metallic frame which will absorb the strains placed upon it and at the same time be of a simple construction which is suitable for manufacturing. When a wearer positions a frame on his head he commonly spreads the temples, the leverage action generated by the lengths of the temples tending to force the endpieces of the frame forwardly and outwardly with respect to the bridge. All of this strain is upon and must be absorbed by the hinges and fittings which connect the temples to the endpieces. Strains are also placed upon the hinge point when adjustments are made between the temples and the frame front by the retailer. And with many users, the eyeglass assembly is, day and night, the favorite outlet for all manner of unconscious nervous movements, for emphasizing a statement, for pointing, and generally for receiving endless adult toying. A realistic producer must be ever mindful of these normal conditions of use.

In Figure 1 a portion of an eyeglass frame is generally indicated at 20 having a rim 22 carrying a lens 24. On one side the rim is integral with a bridge 26 and on the other it is connected (see Figure 2) to a temple 28. The temple is hinged, as will be described, to an endpiece generally indicated at 30 (see Figures 5 and 6) which is split into an upper end section 32 and a lower end section 34 which come together along a parting line 36.

The end sections 32 and 34 are clamped together by a U-shaped metal fitting or clevis generally indicated at 38 including an upper leg 40, a lower leg 42 and a base plate 44. Upper end section 32 includes an upper channel 46; lower end section 34 includes a lower channel 48. The front face of the endpiece contains a face recess 50 extending between and communicating with channels 46 and 48. When the clevis and endpiece are assembled (see Figures 3 and 5), leg 40 occupies channel 46, as a key in a keyway, and leg 42 similarly occupies channel 48. Face recess 50, as can be seen in Figure 6, is so shaped as to receive accurately base plate 44. When the clevis is fully seated upon the endpiece, channel 46 directly overlies channel 48 and sections 32 and 34 are fixed in positive alignment. The rearward ends of legs 40 and 42 extend beyond the rear surface of the endpiece (see Figure 3) to form hinge knuckles 52 and 54, respectively. Knuckle 54 is threaded for a purpose to be described.

In order to secure temple 28 to hinge knuckles 52 and 54 the temple is provided with a hinge plate 58 integrally formed with a hinge barrel 60, hinge plate 58 carrying (see Figures 3 and 6) a pair of stud rivets 62. Rivets 62 pass through temple 28 and a rivet plate 64 in which the outer ends of rivets 62 are set. Thus, rivets 62 and rivet plate 64 securely mount hinge plate 58 on temple 28.

When clevis 38 is firmly seated upon endpiece 30 with knuckles 52 and 54 extending rearwardly therebehind, the pintle opening through barrel 60 is aligned with the openings in knuckles 52 and 54. Thereafter a threaded hinge pin 66 is passed downwardly through knuckle 52 and barrel 60 and is screwed securely through the threaded opening in knuckle 54.

The hinge axis determined by knuckles 52 and 54 is substantially parallel to the rear surface of endpiece 30 extending between channels 46 and 48 and is spaced therefrom by a distance exactly equal to the outside radius of hinge barrel 60. Thus end sections 32 and 34 are immovably locked between base plate 44 on the front and hinge barrel 60 on the rear. As pointed out above, relative sidewise movement between the end sections is precluded by the interkeying of clevis legs 40 and 42 in channels 46 and 48. Attention is invited to the fact that the rigidity of the endpiece assembly is not dependent upon the holding power of delicate jewelers' screws. Nor is there a single screw hole in the endpiece to weaken the construction and complicate molding or machining operations. Endpiece 30, incorporating channels 46 and 48 and recess 50, is molded as an integral, solid unit, as by injection molding, along with rim 22 and bridge 26.

As pointed out hereinabove clevis 38 cooperates with hinge barrel 60 to prevent movement of the two sections of the endpiece in any direction with respect to each other. Furthermore, clevis 38 is interlocked with the endpiece by having its legs and base plate positioned in channels and grooves molded in the endpiece. Thus when the temple is connected to clevis 30, barrel 60 coacts with the clevis to ensure perfect alignment of the two sections of the endpiece and also forms a strong and durable hinge connection between the front of the frame and the temple. Locking the two sections of the endpiece in perfect alignment as achieved by the type of fitting described is of major importance in a split rim because it prevents any strain ever being placed upon a lens at the point where the frame is split.

From the foregoing it will be seen that an eyeglass construction made in accordance with the present invention is well adapted to attain the ends and objects hereinbefore set forth and to be economically manufactured, since suited to common production methods and is susceptible to a wide latitude of variations as may be desirable in adapting the invention to different applications.

As various embodiments may be made of the above invention and as changes might be made in the embodiments above set forth, it is to be understood that all matter hereinbefore set forth or shown in the accompanying drawings is to be interpreted as illustrative and not in a limiting sense.

I claim:

1. In an eyeglass construction, in combination, a pair of non-metallic rim members, a bridge connecting said rim members, an endpiece portion integrally formed on each of said rim members, each of said endpiece portions being horizontally split into two sections whereby said rims may be separated to permit the insertion of lenses therein, a pair of U-shaped clevises having upper and lower legs in contact with the top and bottom surfaces, respectively, of the upper and lower sections of said endpiece portions, the base portion of each of said clevises abutting against the front of each of said endpiece portions, said legs extending rearwardly from said endpiece portions, a pair of temples, a pair of metal fittings secured to the forward ends of said temples, each of said fittings including a barrel portion, said barrel portions being vertically positioned between the rearwardly extending portions of said legs, and hinge pins pivotally connecting said barrel portions to the rearwardly extending portions of said legs, said hinge pins holding said clevises in clamped relationship with respect to said endpiece portions and mounting said barrel portions so that they abut against the rear surfaces of said endpiece portions to hold the clevises and endpiece portions in assembled relationship.

2. In an eyeglass construction, in combination, a pair of non-metallic rim members, a bridge connecting said rim members, an endpiece portion integrally formed on each of said rim members, each of said endpiece portions being horizontally split into two sections whereby said rims may be separated to permit the insertion of lenses, a pair of U-shaped metal fitting each including a base portion and a pair of leg portions, the base portion of each of said fittings abutting against the front of each of said endpiece portions, the leg portions of each of said fittings extending across the upper and lower surfaces of said endpiece portions and thence rearwardly from said endpiece portions, connecting screws extending vertically through the leg portions of each of said fittings said screws being spaced rearwardly from the rear surfaces of said endpiece portions and holding said fittings in clamped relationship with respect to said endpiece portions, and a pair of temples, the forward ends of said temples extending between the leg portions of said fittings, said screws extending through the forward end portions of said temples to pivotally mount said temples on the leg portions of said fittings.

3. In an eyeglass construction, in combination, a pair of non-metallic rim members, a bridge connecting said rim members, an endpiece portion integrally formed on each of said rim members, each of said endpiece portions being horizontally split into two sections whereby said rims may be separated to permit the insertion of lenses, each of said endpiece portions having grooves therein extending transversely thereacross on the upper and lower surfaces thereof, a pair of U-shaped metal fittings each including a base portion and a pair of leg portions, the base portion of each of said fittings abutting against the front of each of said endpiece portions, the leg portions of said fittings being positioned in and interfitting with said grooves, said grooves coacting with said fittings to prevent longitudinal movement of said fittings with respect to said endpiece portions, screws extending through the leg portions of each of said fittings and clamping said fittings together on said endpiece portions, and a pair of temples pivotally mounted on said screws.

4. In an eyeglass construction, in combination, a pair of non-metallic rim members, a bridge connecting said rim members, an endpiece portion integrally formed on each of said rim members, each of said endpiece portions being horizontally split into two sections whereby said rims may be separated to permit the insertion of lenses, each of said endpiece portions having grooves therein extending transversely thereacross on the upper and lower surfaces thereof, a pair of U-shaped metal fittings each including a base portion and a pair of leg portions, the base portion of each of said fittings abutting against the front of each of said endpiece portions the leg portions of said fittings being positioned in and interfitting with said grooves, connecting means extending through the leg portions of each of said fittings and clamping said fittings together on said endpiece portions, and a pair of temples having hinge barrels thereon, said connecting means extending through said hinge barrels, said hinge barrels abutting against the rear surfaces of said endpieces to hold said fittings in assembled relationship with respect to said endpiece portions.

JULIUS E. HANSEN.

REFERENCES CITED

The following references are of record in the file of this patent:

UNITED STATES PATENTS

| Number | Name | Date |
|---|---|---|
| 452,009 | Willson | May 12, 1891 |
| 780,470 | Baker | Jan. 17, 1905 |
| 2,089,237 | Welsh | Aug. 10, 1937 |
| 2,281,812 | Uhlemann et al. | May 5, 1942 |